2,725,329
Patented Nov. 29, 1955

2,725,329

PESTICIDAL COMPOSITION CONTAINING 2,5-P-DIOXANEDITHIOL S,S-BIS(O,O-DIALKYL PHOSPHORODITHIOATE)

Albert H. Haubein, Christiana, Del., assignor to Hercules Powder Company, Wilmington, Del., a corporation of Delaware No Drawing. Application August 30, 1954,
Serial No. 453,138

12 Claims. (Cl. 167—33)

This invention relates to new and useful organic dithiophosphate compounds and to pesticidal compositions containing the same.

The novel organic dithiophosphate compounds of this invention have the general formula

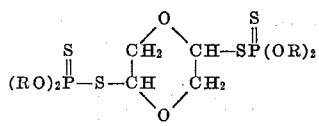

in which each R represents a lower alkyl radical.

These organic dithiophosphate compounds have pesticidal properties and distinguish themselves in being highly toxic at low concentration toward certain pests.

The organic dithiophosphate compounds of this invention are made by reacting 2,5-dichloro-p-dioxane with the desired diester of dithiophosphoric acid, the latter being the product of reaction of a lower aliphatic alcohol or a mixture of lower aliphatic alcohols of the formula ROH and $P_2S_5$. The diester of dithiophosphoric acid may be reacted directly with the 2,5-dichlorodioxane or it may be reacted in the form of its salt or in the presence of materials which sequester the hydrogen chloride set free in the reaction.

The methods of making the products of this invention and methods of using the products as pesticides are more particularly described in the following examples in which all parts and percentages are by weight.

Example 1

To a stirred solution of 10 parts pyridine and 0.2 part hydroquinone in 200 parts benzene was added over a 15 minute period 27 parts O,O-diethyl dithiophosphoric acid. To the resulting salt solution was then added 10 parts 2,5-dichloro-p-dioxane The mixture was then refluxed for 6 hours during which time pyridine hydrochloride separated. At the end of this time, water was added to dissolve the water-soluble salts and the organic layer was further purified by washing first with 5% sodium hydroxide solution and then with water. After drying over sodium sulfate, the solvent benzene was removed under reduced pressure and the residue was topped at 60° C./0.5 mm. The residue, which was the bis(diethyl dithiophosphate) of p-dioxane-2,5-dithiol, also designated 2,5-p-dioxanedithiol-S,S-bis(O,O-diethyl phosphorodithioate), amounted to 22 parts and had the following analysis: S, 27.3%; P, 13.1%; (calcd. for the designated ester) S, 28.1%; P, 13.6%.

An emulsifiable concentrate of the residue was made by mixing 1 gram of the residue with 1 ml. benzene and 1 ml. sorbitan monolaurate polyoxyalkylene derivative (Tween 20). This concentrate was then diluted with water to form dispersions of the residue in water varying in concentration from 1.0% to 0.0025%. The dispersions were then tested for their toxicity to caged insects and to mites. Standard test methods were used for obtaining the results set forth below.

Leaves of lima bean seedlings infested with mites were sprayed with dispersions containing 0.01% and 0.05% of the residue. After five days there was 94% mortality at 0.01% and 74% mortality at 0.05%.

Similar tests with Mexican bean beetles with which lima bean seedlings treated at 0.025% concentration were infested showed 100% mortality in 48 hours.

Example 2

O,O-diisopropyl dithiophosphoric acid was produced by adding 99% isopropyl alcohol to phosphorus pentasulfide ($P_2S_5$) while heating under reflux in benzene solution and venting the hydrogen sulfide evolved. After addition of the alcohol, reflux was continued until evolution of hydrogen sulfide ceased. The product was cooled and filtered. Solvent was removed at 60° C. at 15 mm. pressure leaving the dithiophosphoric acid ester as residue.

To 50 parts of O,O-diisopropyl dithiophosphoric acid was added 250 parts benzene, 0.25 part hydroquinone and 16 parts pyridine. To the resulting solution was then added 16 parts 2,5-dichloro-p-dioxane and the mixture was refluxed for 6 hours. The resulting product was washed with water and then with dilute alkali and then dried over sodium sulfate. After removal of the benzene by distillation, a residue of bis-(diisopropyl dithiophosphate) of p-dioxane-2,5-dithiol amounting to about 38 parts was isolated.

It was made into an emulsifiable concentrate by mixing 1 gram of the residue with 1 ml. benzene and 1 ml. sorbitan monolaurate polyoxyalkylene derivative (Tween 20). This concentrate was then diluted with water to form dispersions of the residue in water of concentrations from 1% to 0.01%. These dispersions were shown to have high toxicity to caged insects and to mites. Using a 0.1% emulsion for spraying pea aphids, a 60% kill was observed in 48 hours.

Example 3

Di-n-propyl dithiophosphoric acid was prepared by the reaction of n-propyl alcohol on phosphorus pentasulfide and was then reacted with 2,5-dichloro-p-dioxane in benzene solution to produce the bis(di-n-propyl dithiophosphate) of p-dioxane-2,5-dithiol. This product was then made into a concentrate with benzene and Tween 20 and diluted to emulsion of various concentrations. These emulsions were then shown to have good toxicity to insects and mites. When pea aphids were sprayed with 0.05% emulsion and placed on pea seedlings sprayed simultaneously with the same emulsion, there resulted 50% mortality in 48 hours.

Example 4

Di-sec-butyl dithiophosphoric acid was prepared by the reaction of sec-butyl alcohol on phosphorus pentasulfide and was then reacted with 2,5-dichloro-p-dioxane in benzene solution to produce the bis(di-sec-butyl dithiophosphate) of p-dioxane-2,5-dithiol. This product was then made into a concentrate with benzene and Tween 20 and diluted to emulsions of various concentrations. These emulsions were then shown to have high toxicity to insects and mites. Using a 0.1% emulsion as a spray on lima bean plants infested with two-spotted spider mites, a 50% kill was obtained in 5 days.

Example 5

Dimethyl dithiophosphoric acid was prepared by the reaction of methyl alcohol on phosphorus pentasulfide and was then reacted with 2,5-dichloro-p-dioxane in benzene solution to produce the bis(dimethyl dithiophosphate) of p-dioxane-2,5-dithiol. This product was made into a concentrate with benzene and Tween 20 and diluted to emulsions of various concentrations. These emulsions were then shown to have high toxicity to insects and mites.

Lima bean plants infested with Mexican bean beetles were sprayed with 1.0% emulsion of the compound of this example whereby 90% mortality resulted. When pea aphids were sprayed with 0.05% emulsion and placed on pea seedlings sprayed with the same emulsion, there resulted 50% mortality.

The organic dithiophosphate compounds of the formula

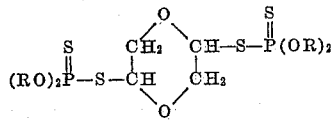

are those in which each R is the same or a different lower alkyl radical: methyl, ethyl, n-propyl, isopropyl, isobutyl, sec-butyl or n-butyl. In the above definition of the scope of the compounds of this invention "lower alkyl" is defined to include those alkyl radicals with 1–4 carbon atoms.

In producing the compounds of this invention the reaction between the 2,5-dichloro-p-dioxane and the ester of dithiophosphoric acid or its salt is carried out by heating the two reactants at a temperature at which reaction takes place but below the decomposition temperature in the range of 20° to 200° C., preferably in the range of 30° to 110° C. The reactants may be mixed in any desired order. In order to get complete reaction it is preferable to use an excess over the theoretical amount of the ester of the dithiophosphoric acid. When the reaction is complete, the excess ester of the dithiophosphoric acid is readily removed by washing with water containing sufficient alkali to produce the water-soluble salt.

The reaction is preferably carried out in nonaqueous media. Organic solvents are desirable to aid in control of the reaction. Suitable solvents include benzene, toluene, xylene, cyclohexane, hexane, anhydrous alcohol solvents and dioxane. It is preferable to use hydrocarbon solvents when using an amine salt of the dithiophosphoric acid ester or when using an amine or ammonia as a sequestering reagent. After the reaction is complete, the solvent is readily removed by distillation.

When the diester of dithiophosphoric acid is used as the free acid in the reaction with the 2,5-dichloro-p-dioxane, hydrogen chloride which is liberated is preferably sequestered by adding a material to combine with the hydrogen chloride as formed. It is convenient to use pyridine for this purpose. However, in its place other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the 2,5-dichloro-p-dioxane as in Example 1. Amines which can be used include pyridine, tertiary alkyl amines such as trimethyl amine, tributyl amine, triamyl amine, dimethyl aniline and the like. Inorganic bases may also be used. These include ammonia, alkali metal hydroxides, carbonates and bicarbonates, and alkaline earth metal hydroxides and carbonates.

As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive hydrocarbon solvents. When the free acid is reacted with the 2,5-dichlorodioxane, the alkaline material is preferably added gradually as needed but it can be added all at once if desired. Ammonia is suitably added gradually as a gas, the solids are suitably added in finely divided form.

The thiophosphoric acid ester is produced by reacting the lower aliphatic alcohol, which is to form a part of the ester, with $P_2S_5$ preferably in a nonreactive solvent such as benzene, toluene, xylene, hexane or cyclohexane and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the 2,5-dichloro-p-dioxane.

The methods by which the products of this invention are isolated will vary slightly with the reactants used and the product produced. If some instances the chloride salt split out in the reaction separates and can be filtered off. In other instances the chloride salt is best removed by washing with water. The excess salt of the ester of dithiophosphoric acid is also removed by the water wash. The benzene or other solvent is then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrum, and the like, in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface active dispersing agent and water as the essential ingredients. The amount of the compounds of this invention in the aqueous dispersions when diluted for spraying of plants will be in the range of about 10% to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface active dispersing agent. The concentrate may also contain small amounts of organic solvents to aid in effective dispersion. The amount of surface active dispersing agent used is usually at least 5% of the amount of toxic compound in the concentrate.

Suitable surface active dispersing agents for use in the compositions of this invention are those disclosed in Chemistry of Insecticides, Fungicides and Herbicides (l. c., pages 280–287) for use with known insecticides and include neutral soaps of resin, alginic and fatty acids and alkali metals or alkyl amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, attapulgite, and bentonite and related hydrated aluminum silicates having the property of forming a colloidal gel. Among the other surface active dispersing agents which are useful in the compositions of this invention are the omega-substituted polyethylene glycols of relatively long-chain length, particularly those in which the omega substituent is aryl, alkyl, or acyl. Compositions of the toxic material and surface active dispersing agent will in some instances have more than one surface active dispersing agent for a particular type of utility, or in addition to a surface active dispersing agent, hydrocarbons such as kerosene and mineral oil will also be added as improvers. Thus, the toxic material may contain a clay as the sole adjuvant or clay and hydrocarbon, or clay and another surface active dispersing agent to augment the dispersing action of the clay. Likewise, the toxic material may have water admixed therewith along with the surface active dispersing agent, sufficient generally being used to form an emulsion. All of these compositions of toxic material and surface active dispersing agent may contain in addition synergists and/or adhesive or sticking agents.

What I claim and desire to protect by Letters Patent is:

1. As a new composition of matter a compound of the formula

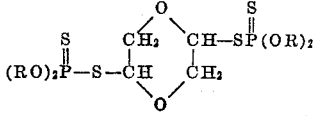

in which each R represents a lower alkyl radical.

2. As a new composition of matter a compound of the formula

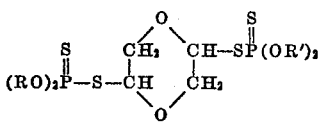

in which R and R' represent different lower alkyl radicals.

3. As a new composition of matter a compound of the formula

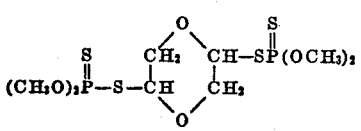

4. As a new composition of matter a compound of the formula

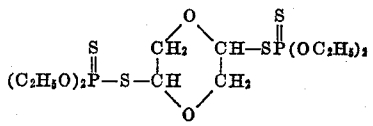

5. As a new composition of matter a compound of the formula

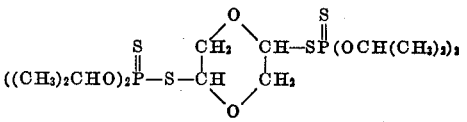

6. As a new composition of matter a compound of the formula

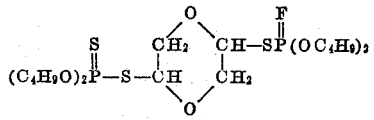

7. A pesticidal composition comprising the compound of claim 1 and an insecticidal adjuvant.

8. A pesticidal composition comprising the compound of claim 2 and an insecticidal adjuvant.

9. A pesticidal composition comprising the compound of claim 3 and an insecticidal adjuvant.

10. A pesticidal composition comprising the compound of claim 4 and an insecticidal adjuvant.

11. A pesticidal composition comprising the compound of claim 5 and an insecticidal adjuvant.

12. A pesticidal composition comprising the compound of claim 6 and an insecticidal adjuvant.

References Cited in the file of this patent
UNITED STATES PATENTS

| | | |
|---|---|---|
| 2,529,304 | Mikeska | Nov. 7, 1950 |
| 2,531,129 | Hook | Nov. 21, 1950 |
| 2,542,604 | Weisel | Feb. 20, 1951 |
| 2,565,920 | Hook | Aug. 28, 1951 |
| 2,565,921 | Hook | Aug. 28, 1951 |